United States Patent
Coon et al.

(10) Patent No.: US 6,539,358 B1
(45) Date of Patent: Mar. 25, 2003

(54) VOICE-INTERACTIVE DOCKING STATION FOR A PORTABLE COMPUTING DEVICE

(75) Inventors: Bradley S. Coon, Kokomo, IN (US); Ronald K. Reger, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/577,860

(22) Filed: May 24, 2000

(51) Int. Cl.[7] .................. G10L 21/06; G10L 15/04; G06F 13/14

(52) U.S. Cl. .............. 704/275; 704/270; 704/251; 710/303

(58) Field of Search .................. 704/258–269, 704/270–272, 251, 275; 455/552, 435; 709/219; 710/73, 303

(56) References Cited

U.S. PATENT DOCUMENTS 5,522,089 A * 5/1996 Kikinis et al. ............. 710/73
5,914,941 A * 6/1999 Janky ...................... 709/219
5,949,776 A * 9/1999 Mahany et al. ............ 455/435
6,202,008 B1 * 3/2001 Beckert et al. ............ 455/552

* cited by examiner

Primary Examiner—Richemond Dorvil
Assistant Examiner—Daniel A Nolan
(74) Attorney, Agent, or Firm—Jimmy L. Funke; Stefan V. Chmielewski

(57) ABSTRACT

A voice-interactive docking station is provided for use with a portable computing device. The portable computing device includes at least one information management application and a corresponding database for storing the data associated with the information management application. The docking station generally includes a speech input device for receiving speech input, a speech recognizer for translating the speech input into voice command data, and an interface application for interacting with the applications residing on the portable computing device. In particular, the interface application, in response to voice command data, accesses the data associated with the information management application residing on the portable computing device. The docking station may further include a text-to-speech synthesizer for converting output data from the interface application into speech output data, and an audio system for generating audio output from the speech output data.

20 Claims, 3 Drawing Sheets

VOICE-INTERACTIVE DOCKING STATION FOR A PORTABLE COMPUTING DEVICE

TECHNICAL FIELD

The present invention relates generally to a docking station for a portable computing device and, more particularly, to a voice-interactive docking system for use in a motor vehicle.

BACKGROUND OF THE INVENTION

Portable computing devices, such a Palm™ personal digital assistant handheld computing device, are not designed to be safely used by the driver of a motor vehicle. Accessing information on a portable computing device typically involves viewing a display screen that presents information to the user and/or entering information using a stylus by writing on the display screen. Each of these access methods require the driver of a motor vehicle to at least momentarily take their eyes off the road, thereby causing safety concerns.

Although portable computing devices offer ideal opportunities to exploit speech technology, they also present a challenge in that processing power and memory is often limited within the device. To limit memory usage, a typical embedded speech recognition system will have a very limited, static vocabulary. In this case, condition-specific words, such as the names found in an address book, may not be recognized by the system. Therefore, it is desirable to provide a voice-interactive docking station for a portable computing device that is being used in a motor vehicle.

To complement the portable computing device, the docking station provides the additional processing power and memory needed to support robust speech recognition and/or speech synthesis features. In this way, the voice-interactive docking station provides hands-free information access to the portable computing device for the driver of a motor vehicle. Additionally, the docking station serves as an interface between the portable computing device and other vehicle systems.

SUMMARY OF THE INVENTION

In accordance with the present invention, a voice-interactive docking station is provided for a portable computing device. The portable computing device includes at least one information management application and a corresponding database for storing the data associated with the information management application. The docking station generally includes a speech input device for receiving speech input, a speech recognizer for translating the speech input into voice command data, and an interface application for interacting with the applications residing on the portable computing device. In particular, the interface application, in response to voice command data, accesses the data associated with the information management application residing on the portable computing device. The docking station may further include a text-to-speech synthesizer for converting output data from the interface application into speech output data, and an audio system for generating audio output from the speech output data.

For a more complete understanding of the invention, its objects and advantages, refer to the following specification and to the accompanying drawings.

DESCRIPTION OF THE PREFERRED EMBODIMENT

Figure 1:
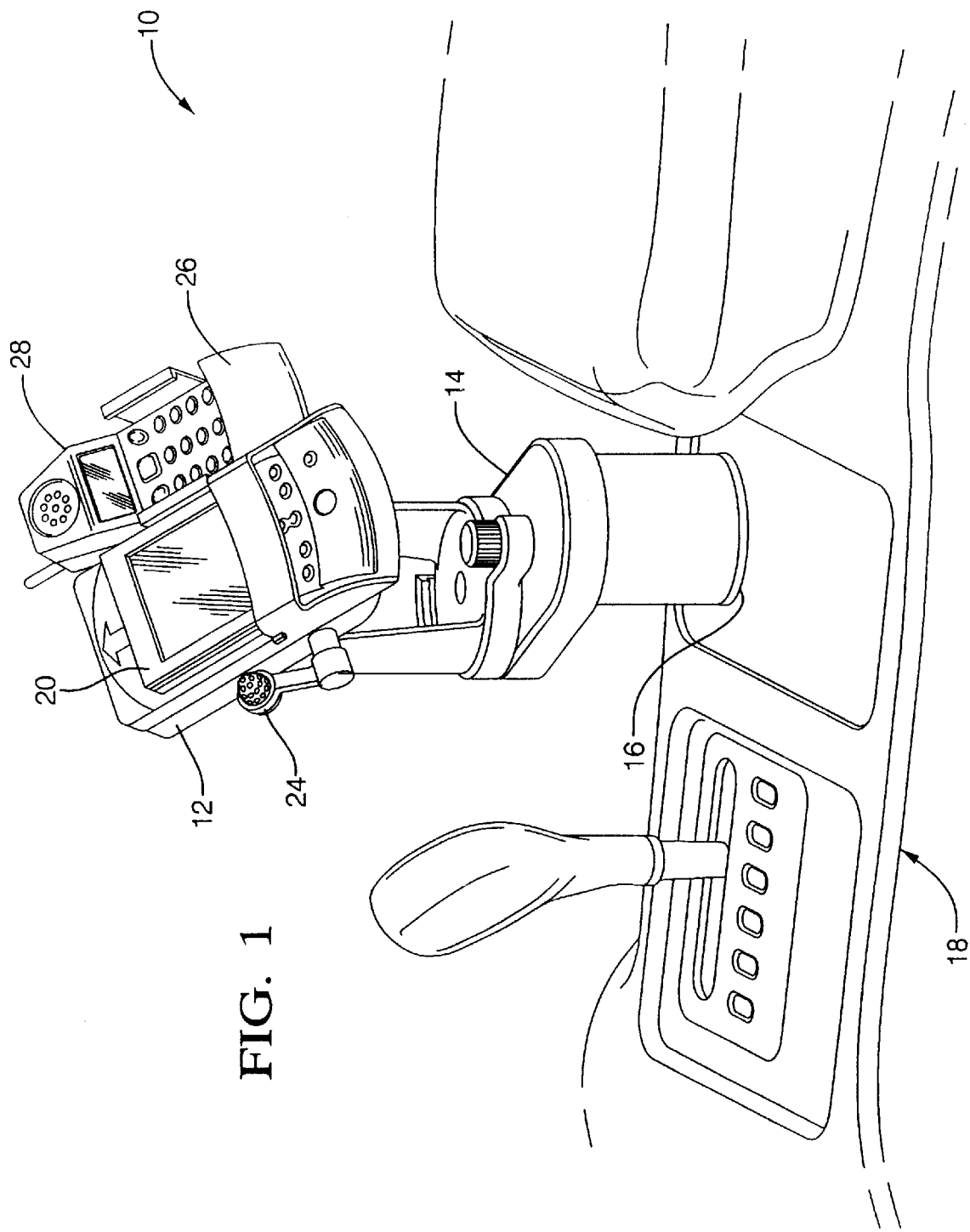
FIG. 1 is a diagram of a voice-interactive docking station embodying features of the present invention in the context of a motor vehicle.

A voice-interactive docking system 10 for use in a motor vehicle is shown in FIG. 1. In this presently preferred embodiment, a docking station 12 couples to a mounting device 14 that securely attaches the docking station 12 to the interior of the motor vehicle. The mounting device 14 pivotally attaches to the docking station and securely couples into a cup holder 16 in the center console 18 of a motor vehicle. The mounting device 14 may have other configurations as well as couple to other interior components of the motor vehicle. It is envisioned that the docking station 14 is accessible to at least one of the passengers within the motor vehicle. While the following description is provided with reference to a docking station for use in a motor vehicle, it is readily understood that the broader aspects of the present invention are applicable to a docking station configured for other types of applications.

The docking station 12 is adapted to receive a portable computing device 20. An exemplary portable computing device 20 may be any one of the commercially available Palm handheld computing devices. However, other types of handheld computing devices and/or personal digital assistants may be used with the docking station 12. To facilitate the electrical connection with different portable computing devices, the docking station 12 may provide a modular interface connector 22. The modular interface connector 22 is an interchangeable component that provides a serial data interface for data transmission between the portable computing device 20 and the docking station 12. A push button 23 positioned on the front of the docking station 12 may be used activate the system. The docking station 12 further includes a microphone 24 for receiving speech input, and, optionally, a secondary docking station 26 for a cellular telephone 28.

Figure 2:
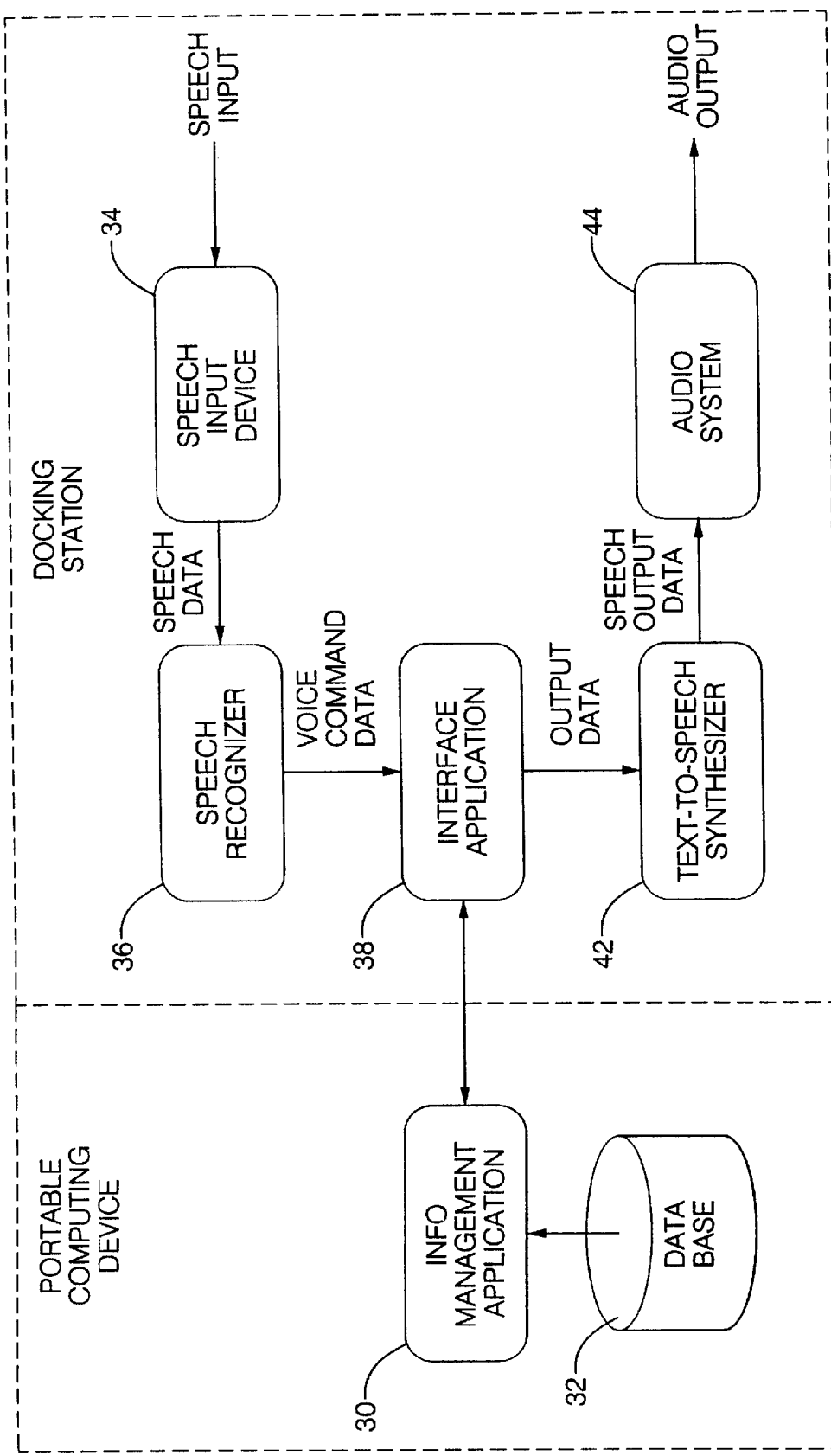
FIG. 2 is a block diagram illustrating the software-implemented components of the voice-interactive docking system in accordance with the present invention.

Referring to FIG. 2, the portable computing device 20 includes at least one information management application 30 and a corresponding database 32 for storing the data associated with the information management application 30. An exemplary information management application 30 may be any one of an address book application, an e-mail application, a calendar application, a memo pad application, a personal finance application, a Web-browsing application, a word processor application, or other similar information management applications.

In accordance with the present invention, the speech-enabled docking station 12 generally includes a speech input device 34 (e.g., a microphone) for receiving speech input, a speech recognizer 36 for translating the speech input into voice command data, and an interface application 38 for interacting with the applications residing on the portable computing device 20. In response to voice command data from the speech recognizer 36, the interface application 38 is operable to access the database 32 residing on the portable computing device 20. In this way, the interface application 38 can retrieve and/or update data associated with the information management application.

Alternatively, the interface application 38 may extract data from the database 32 prior to receiving voice command data. Upon docking the portable computing device 20 into the docking station 12 or upon activation of the system, the interface application 38 copies requestable data into a memory space residing on the docking station 12. In this approach, the interface application 38 responds to voice command data by retrieving data from the local memory space. It is envisioned that the interface application 38 is also operable to update and/or synchronize the local memory space with the database 32 residing on the portable computing device 20.

Additionally, the docking station 12 may further include a text-to-speech synthesizer 42 for converting output data from the interface application 38 into speech output data, as well as an audio system 44 for generating audio output. One skilled in the art will appreciate that the speech recognizer 36 and/or the text-to-speech synthesizer 42 may be implemented using various commercial available speech products, for example, one from the ASR 1600 text to speech synthesizer series of products manufactured by Lernout & Hauspie. It is to be understood that other software-implemented functions may be needed to control and manage the overall operations of the docking system 10 and that only the relevant components of the voice-interactive docking system 10 are shown in FIG. 2.

A description of an exemplary use will help to better understand the voice-interactive docking system 10. In this example, the system user wants to place a telephone call using his cellular telephone. The user might speak the telephone number of the person they wish to call and the system would interact with the cellular telephone to place the call. Alternatively, if the user is unsure of the telephone number, they may access this information from an address book application residing on the portable computing device.

A push button on the front of the docking station 12 activates the system. Upon activation, the text-to-speech synthesizer 42 at the direction of the interface application 38 generates the audible output "Ready" which indicates that the system is ready to process voice commands from the user.

In this instance, the user provides a voice command—"Address book". The voice command is received via the speech input device 34 by the speech recognizer 36. The speech recognizer 36, in turn, provides the corresponding voice command data to the interface application 38. The interface application 38 then directs the text-to-speech synthesizer 42 to ask the user for the name of the person they wish to call. For example, the text-to-speech synthesizer 42 provides the audio instruction—"Name please". In response, the user can speak the name of the person they wish to call, for example, "Dave Smith".

Preferably, the system verifies its identification of the name spoken by asking the user—"Did you say Dave Smith?" If the user responds affirmatively, then the system requests further instructions from the user. An exemplary instruction might be "Would you like to hear the person's address information, place a telephone call to the person, or send an email message to the person?" In this example, the user instructs the system to place a call to the phone number associated with the requested person. The interface application 38 accesses the address book application to retrieve the phone number associated with the requested person. Next, the interface application 38 interacts with the cellular telephone to dial the telephone number retrieved from the portable computing device. Upon completion of the conversation, the user may provide additional voice commands and/or press the push button to terminate the telephone connection. The voice-interactive docking system 10 is not limited to the above-described feature. On the contrary, the docking system 10 may support other voice-enabled functions, including (but not limited to) reading email messages, sending email messages, reviewing appointments in a calendar, or accessing in real-time various information (e.g., today's news, stock prices or sports scores) retrieved via a Web-browser application from the Internet.

Figure 3:
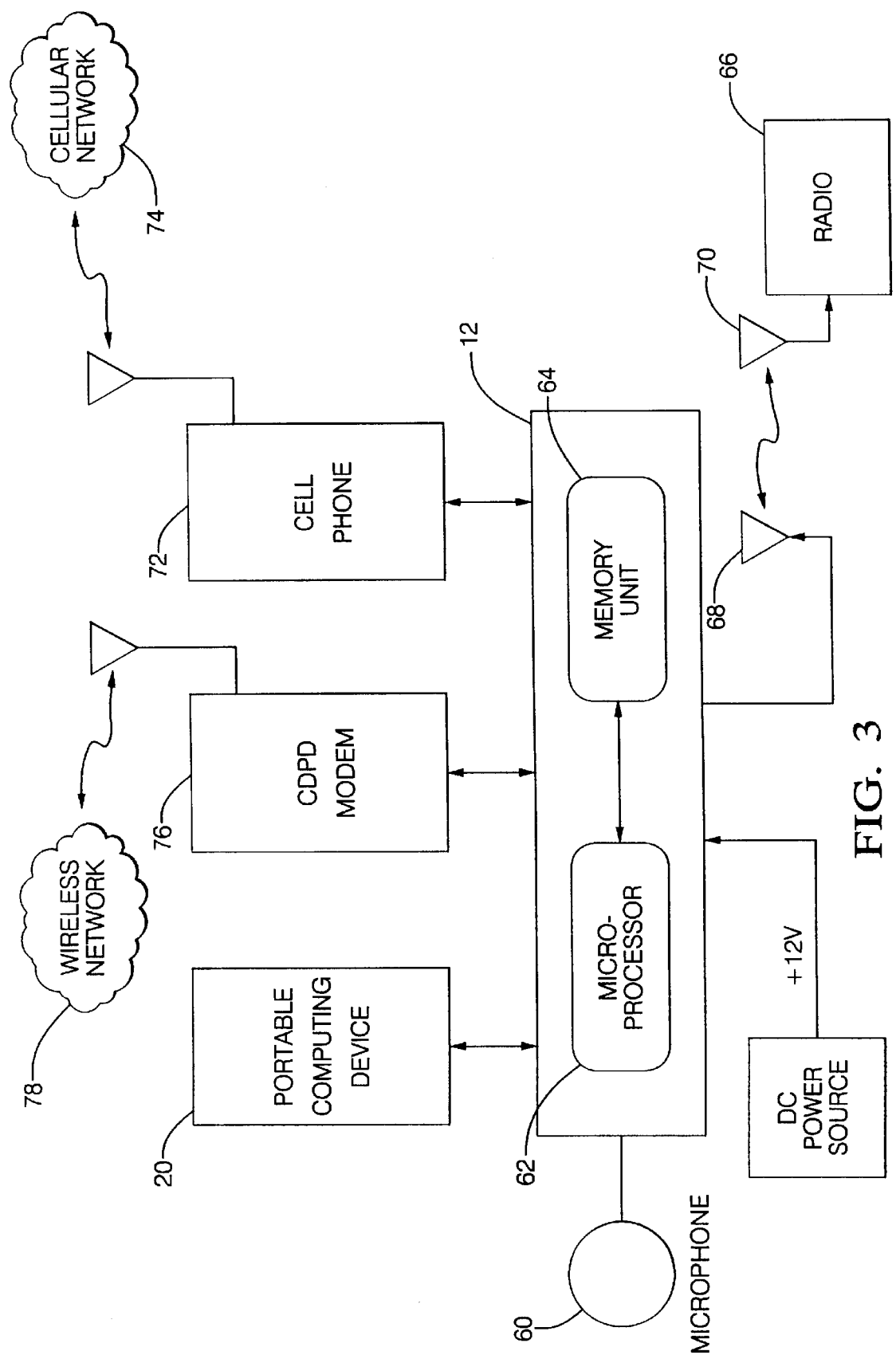
FIG. 3 is a block diagram illustrating the hardware components of the voice-interactive docking system in a preferred embodiment of the present invention.

For illustration purposes, a preferred embodiment of the hardware components of the docking system 10 are depicted in FIG. 3. A microphone 60 for capturing voice input may be an external device or an internal device integrated into the docking station 12. In order to support the speech recognizer, the interface application and the text-to-speech synthesizer, the docking station 12 further includes a microprocessor 62 and a memory unit 64. As will be apparent to one skilled in the art, the hardware platform for the docking station 12 is configured to support the above-described features of the system. An analog-to-digital converter (not shown) for converting the voice input into a digital format is positioned between the microphone 60 and the microprocessor 62. Conversely, a digital-to-analog (not shown) converter for converting digital audio output into analog format is positioned between the microprocessor 62 and an external audio system.

In this preferred embodiment, a radio 66 serves as the audio system. A low-power FM modulator 68 transmits audio to an unused frequency on a FM receiver 70 associated with any conventional radio 66. Alternatively, a speaker integrated into the docking station may also serve as the audio system. It is further envisioned that other types of audio systems may be used in conjunction with the docking station 12.

To interface with the portable computing device 20, the docking station 12 provides a serial data interface connection (e.g., a RS232 interface). In this regard, the portable computing device 20 and the docking station 12 are configured with suitable communication software and hardware platforms. The docking station 12 may provide additional data ports (e.g., serial port, parallel port, universal serial bus port, etc.) for interfacing with other types of communication devices. In a first instance, a cellular telephone 72 interconnects with one of the data ports to provide communication across a wireless cellular network 74. In a second instance, a Cellular Digital Packet Data (CDPD) modem device 76 interconnects with another of the data ports to provide Internet access across a CDPD wireless network 78. One skilled in the art will readily recognize that other types of communication devices may also be supported by the docking station.

Lastly, the docking station 12 is configured to receive electrical power from a conventional DC power source. In this embodiment, the docking station 12 uses a conventional adapter to connect to the cigarette lighter of the motor vehicle. It is further envisioned that the docking station 12 may be operable to pass through some of the electrical power in order to recharge the battery of either the portable computing device, the cellular telephone or another interconnected communication device.

While the above description constitutes the preferred embodiment of the invention, it will be appreciated that the invention is susceptible to modification, variation, and change without departing from the proper scope or fair meaning of the accompanying claims.

What is claimed is:

1. A voice-interactive docking station for a portable computing device, comprising:
   a database for storing data associated with an information management application residing on the portable computing device;
   a docking receptacle adapted to receive the portable computing device includes:
   a speech input device for receiving speech data;
   a speech recognition system for receiving speech data from the speech input device and operable to translate the speech data into voice command data; and
   an interface application for receiving voice command data from the speech recognition system and, in response to the voice command data, operable to access the data in the database.

2. The docking station of claim 1 wherein the interface application is operable to generate user output data based on at least one of the voice command data or the data accessed from the information management application.

3. The docking station of claim 2 further comprising a text-to-speech synthesizer connected to the interface application for converting the user output data into speech output data, and an audio system connected to the text-to-speech synthesizer for generating audio output.

4. The docking station of claim 3 further comprising an RF transmitter for transmitting the speech output data to a radio that serves as the audio system.

5. The docking station of claim 2 further comprising a radio frequency (RF) transmitter for transmitting the user output data across a wireless network.

6. The docking station of claim 5 further comprising an RF receiver for receiving user input data over a wireless network.

7. The docking station of claim 5 wherein the wireless network is further defined as at least one of an analog cellular network or a cellular digital packet data network.

8. The docking station of claim 1 further comprising a telephone connected to the interface application, wherein the interface application is operable to dial the telephone based on a telephone number retrieved from the information management application.

9. The docking station of claim 1 further comprising a Cellular Digital Packet Data (CDPD) modem connected to the interface application, wherein the interface application is operable to retrieve information over a wireless network from the Internet.

10. The docking station of claim 1 wherein the information management application is selected from the group comprising an address book application, an email application, a calendar application, a memo pad application, a personal finance application, and a Web-browser application.

11. The docking station of claim 1 further comprising a mounting device for securely attaching the docking receptacle to the interior or a motor vehicle.

12. A voice-interactive docking system for use in conjunction with a motor vehicle, comprising:
   a portable computing device having at least one information management application and a database for storing data associated with the information management application;
   a docking station adapted to receive the portable computing device, wherein the docking station further includes:
   a microphone for receiving speech data;
   a speech recognizer connected to the microphone for translating the speech data into voice command data; and
   an interface application connected to the speech recognizer for receiving voice command data and connected to the portable computing device for accessing the data associated with the information management application.

13. The docking system of claim 12 wherein the interface application is operable to generate user output data based on at least one of the voice command data or the data accessed from the information management application.

14. The docking system of claim 13 further comprising a text-to-speech synthesizer connected to the interface application for converting the user output data into speech output data, and an audio system connected to the text-to-speech synthesizer for converting the speech output data into audio output.

15. The docking system of claim 14 further comprising an RF transmitter for transmitting the speech output data from the text-to-speech synthesizer to a radio in the motor vehicle.

16. The docking system of claim 12 wherein the interface application is operable to extract the data associated with the information management application and store the data in a memory space residing on the docking station.

17. The docking system of claim 12 further comprising a telephone connected to the interface application, wherein the information management application is operable to dial the telephone based on a telephone number retrieved from the information management application.

18. The docking system of claim 12 further comprising a CDPD modem connected to the interface application, wherein the interface application is operable to retrieve information over a wireless network from the Internet.

19. The docking system of claim 12 wherein the information management application is selected from the group comprising an address book application, an email application, a calendar application, a memo pad application, a personal finance application, and a Web-browser application.

20. The docking system of claim 12 further comprising a mounting device for securely coupling the docking station into a cupholder of the motor vehicle.

* * * * *